Patented Jan. 14, 1936

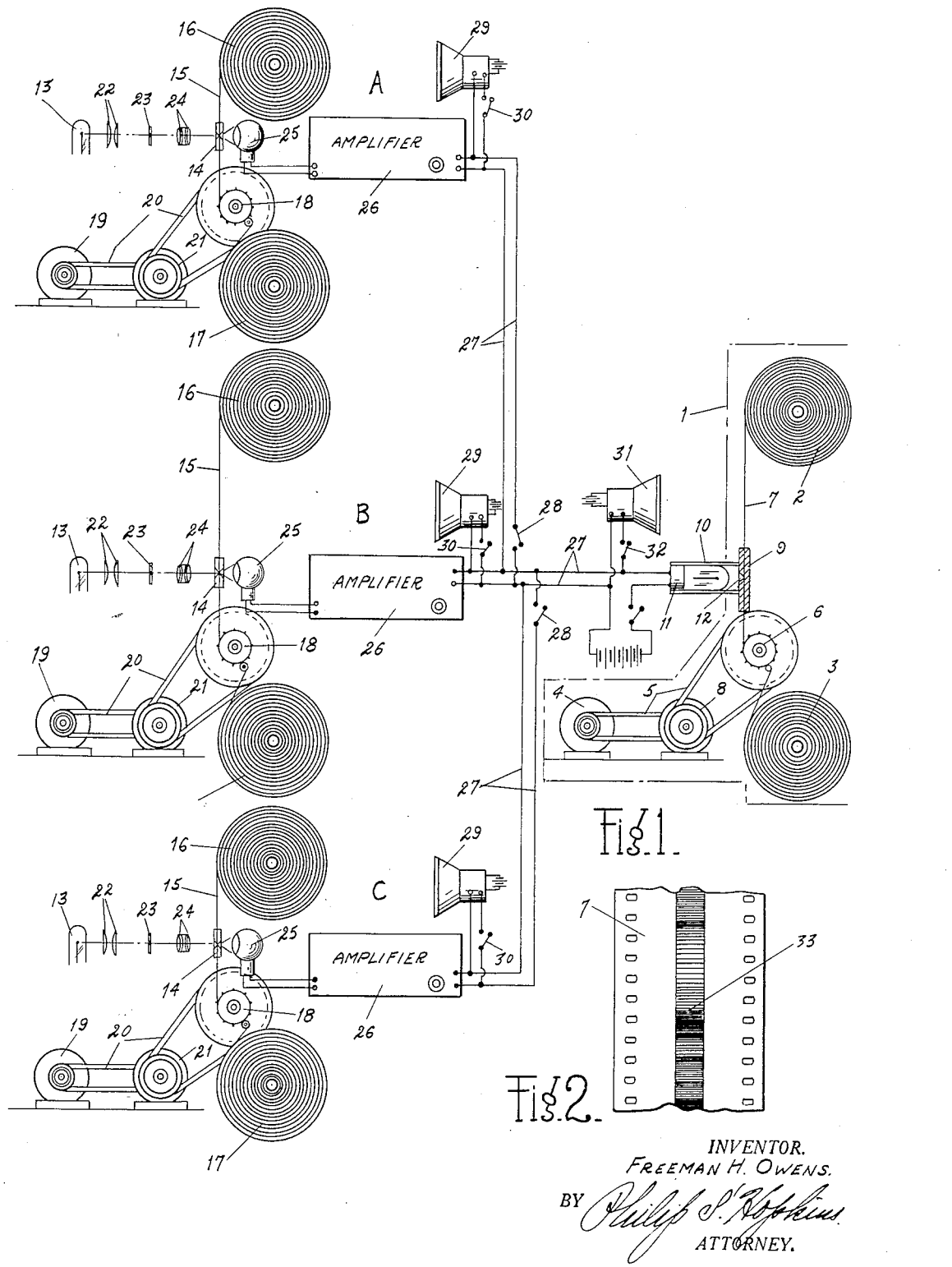

2,028,006

UNITED STATES PATENT OFFICE 2,028,006

PHOTOGRAPHIC SOUND RECORDING APPARATUS

Freeman H. Owens, New York, N. Y.

Application July 9, 1930, Serial No. 466,728

3 Claims. (Cl. 179—100.3)

This invention relates to improvements in photographic sound recording apparatus, the principal object of the invention being to provide a device by means of which a plurality of sound records carried on individual films may be combined and re-recorded as a single composite film.

Other objects and advantages of the invention will appear as the description proceeds.

In the drawing accompanying this specification,

Figure 1 is a diagrammatic side view of an apparatus embodying the features of the present invention; and Figure 2 is a plan view of a portion of a film illustrating a composite sound record produced by the apparatus described herein.

Referring to the drawing, 1 designates a housing in which are mounted a film supply reel 2, a takeup reel 3, and a motor 4, from which motion is imparted by suitable belt transmission 5 to a sprocket 6 adapted to engage a film 7 and cause it to travel from the supply reel to the takeup reel. A governor 8 is preferably interposed between the motor and the sprocket 6 for controlling the speed of the latter. In the path of the film 7 as it passes from the supply to the takeup reel is mounted a film gate 9, through which the film is threaded, said gate forming the end wall of a lamp housing 10 mounted in the wall of the housing 1, and in which lamp housing is disposed a recording lamp 11 the light rays from which will pass to the film through an opening 12 in the gate.

The lamp 11 is electrically connected with three distinct sound reproducing units A, B and C, each of which comprises a reproducing lamp 13 disposed in alignment with a film gate 14 through which passes a film 15 on its way from a supply reel 16 to a takeup reel 17, said film carrying a sound record which has been previously recorded thereon. A sprocket 18 is suitably mounted for engaging said film and causing it to travel from the supply to the takeup reel. A motor 19 is provided for imparting motion by means of belt transmission 20 to said sprocket, a governor 21 being preferably interposed between said motor and sprocket for controlling the speed of rotation of the latter. Between the lamp 13 and film gate 14 is disposed the usual optical unit, comprising a condensing lens 22, a slit partition 23 and a focusing lens 24, by means of which the aerial image of the slit in the partition 23 is focused upon the film during its passage through the gate 14. At that side of the film gate 14 opposite from the lamp is mounted a photo electric cell 25 with its window disposed in position to catch the light rays after their passage through the sound record on the film and by which sound record they are modulated. The output of the photo electric cell is electrically connected with an amplifier 26, the output of which is connected by wires 27 with the recording lamp 11, individual switches 28 being included in said amplifier circuits for selectively cutting in and out said circuits. A loud speaker 29 may be connected across each amplifier circuit, and a switch 30 provided for each of said loud speakers, by means of which an operator can listen in on the output of the individual amplifiers. A loud speaker 31 may also be provided in the recording lamp circuit with a switch 32 for cutting in and out said speaker, so that an operator may check up on the volume and character of the composite sound record.

It is believed that the operation of the apparatus will be clear from the foregoing. The light rays modulated by their passage through the sound records carried by films 15 are caught by the individual photo electric cells and translated into electrical impulses which are amplified by the respective amplifiers and delivered to the recording lamp 11. It will thus be readily seen that the sound record 33 produced by said lamp on the film 7 will be a true composite of the three sound records carried by the films 15. It will be understood, of course, that the re-recording may be at a speed different from the speeds at which the original recordings were made.

I claim:

1. A photographic sound recording apparatus, comprising in combination, means for supporting a traveling sensitized film, a plurality of individual sound record translating units, means for simultaneously combining the translated sound from all of said units and re-recording the same as a single composite sound record on said sensitized film, and means for rendering said translated sounds from each of said units audible at the time of such re-recording.

2. A photographic sound recording apparatus, comprising in combination, means for supporting a traveling sensitized film, means for supporting a plurality of traveling films each carrying a sound record, individual means for translating said sound records, means for simultaneously combining the translated records and re-recording the same as a single composite sound record on said sensitized film, and means for rendering said translated sounds from each of said units audible at the time of such re-recording.

3. A photographic sound recording apparatus, comprising in combination, a recording lamp, means for supporting a traveling sensitized film in position to receive rays of light from said lamp, a plurality of individual sound translating units electrically connected with said lamp thereby to simultaneously combine the translations of said units for modifying the intensity of the lamp and record a single composite sound record on said sensitized film, and means for rendering said translated sounds from each of said units audible at the time of such re-recording.

FREEMAN H. OWENS.